(12) United States Patent
Fortunato et al.

(10) Patent No.: US 11,152,030 B1
(45) Date of Patent: Oct. 19, 2021

(54) INTERFACE FOR SETTING SPEED AND DIRECTION OF VIDEO PLAYBACK

(71) Applicant: GoPro, Inc., San Mateo, CA (US)

(72) Inventors: Steven Fortunato, Solana Beach, CA (US); Evan Kosowski, San Diego, CA (US); Rachael Irene Hines Thompson, Oceanside, CA (US); Renaud Cousin, San Mateo, CA (US); Nicolas Duponchel, San Mateo, CA (US); Thomas Achddou, Paris (FR); Joshua Hamill, Poway, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 16/948,024

(22) Filed: Aug. 27, 2020

(51) Int. Cl.
*G11B 27/00* (2006.01)
*H04N 21/845* (2011.01)
*H04N 21/472* (2011.01)
*G11B 27/34* (2006.01)

(52) U.S. Cl.
CPC ............ *G11B 27/005* (2013.01); *G11B 27/34* (2013.01); *H04N 21/47217* (2013.01); *H04N 21/8456* (2013.01)

(58) Field of Classification Search
CPC .............. G11B 27/005; G11B 27/34; H04N 21/47217; H04N 21/8456
See application file for complete search history.

(56) References Cited

U.S. PATENT DOCUMENTS

| | | | |
|---|---|---|---|
| 2012/0030634 A1* | 2/2012 | Miyazaki | G06F 3/04847 715/863 |
| 2014/0029916 A1* | 1/2014 | Dhawan | H04N 9/87 386/248 |

* cited by examiner

*Primary Examiner* — Girumsew Wendmagegn
(74) *Attorney, Agent, or Firm* — Esplin & Associates, PC

(57) ABSTRACT

A graphical user interface for setting speed and direction of video playback may include a timeline representation of video duration. Playback speed and playback direction from a selected point of the video may be determined based on user interaction with the graphical user interface. A portion of the video to which the selected playback speed and selected playback direction is applied may be determined based on user movement of the timeline representation.

20 Claims, 5 Drawing Sheets

INTERFACE FOR SETTING SPEED AND DIRECTION OF VIDEO PLAYBACK

FIELD

This disclosure relates to an interface for setting speed and direction of video playback.

BACKGROUND

A user may wish to create a video edit with different playback speeds and playback direction for different segments. Selecting different playback speeds and playback directions, and designating which segments of the video will be affected by the selected playback speeds and playback directions may not be difficult, complicated, and unintuitive.

SUMMARY

This disclosure relates to an interface for setting speed and direction of video playback. Video information and/or other information may be obtained. The video information may define video content having a progress length. A graphical user interface may be presented on a display. The graphical user interface may include interface elements that facilitate selection of playback direction and playback speed for the video content. The interface elements may include a playback direction element, a playback speed element, a timeline element, and/or other interface elements. The playback direction element may enable user selection of the playback direction from a selected moment within the progress length. The playback speed element may enable user selection of the playback speed in the selected playback direction from the selected moment within the progress length. The timeline element may include a timeline representation of the progress length and enable user selection of a portion of the video content to which the selected playback direction and the selected playback speed are applied.

The selected playback direction from the selected moment within the progress length may be determined based on user interaction with the playback direction element and/or other information. The selected playback speed in the selected playback direction from the selected moment within the progress length may be determined based on user interaction with the playback speed element and/or other information. The portion of the video content to which the selected playback direction and the selected playback speed are applied may be determined based on user interaction with the timeline element and/or other information. The portion of the video content may start or end with the selected moment within the progress length. The selected playback direction and the selected playback speed may be applied to the portion of the video content to generate a presentation of the video content. The presentation of the video content may include modification of the playback direction and the playback speed for the video content based on the selected playback direction and the selected playback speed for the portion of the video content, and/or other information.

A system that presents an interface for setting speed and direction of video playback may include one or more electronic storage, processor, and/or other components. The electronic storage may store video information, information relating to video content, information relating to graphical user interface, information relating to interface elements, information relating to playback direction, information relating to playback speed, information relating to presentation of video content, and/or other information.

The processor(s) may be configured by machine-readable instructions. Executing the machine-readable instructions may cause the processor(s) to facilitate presenting an interface for setting speed and direction of video playback. The machine-readable instructions may include one or more computer program components. The computer program components may include one or more of a video information component, a graphical user interface component, a playback direction component, a playback speed component, a video portion component, a generation component, and/or other computer program components.

The video information component may be configured to obtain video information and/or other information. The video information may define video content. The video content may have a progress length.

The graphical user interface component may be configured to present a graphical user interface on a display. The graphical user interface may include interface elements that facilitate selection of playback direction and playback speed for the video content. The interface elements may include a playback direction element, a playback speed element, a timeline element, and/or other interface elements. The playback direction element may enable user selection of the playback direction from a selected moment within the progress length. The playback speed element may enable user selection of the playback speed in the selected playback direction from the selected moment within the progress length. The timeline element may include a timeline representation of the progress length. The timeline element may enable user selection of a portion of the video content to which the selected playback direction and the selected playback speed are applied. In some implementations, the video content may be presented on the display.

In some implementations, the playback direction selectable via the playback direction element may include forward playback direction, reverse playback direction, pause playback direction, and/or other playback direction.

In some implementations, the interface elements may further include a direction-speed element. The direction-speed element may enable user selection of the selected moment within the progress length. The selected moment within the progress length may be determined to be a current moment of the video content presented on the display based on user interaction with the direction-speed element and/or other information.

The playback direction component may be configured to determine the selected playback direction from the selected moment within the progress length based on user interaction with the playback direction element and/or other information.

The playback speed component may be configured to determine the selected playback speed in the selected playback direction from the selected moment within the progress length based on user interaction with the playback speed element and/or other information.

The video portion component may be configured to determine the portion of the video content to which the selected playback direction and the selected playback speed are applied based on user interaction with the timeline element and/or other information. The portion of the video content may start or end with the selected moment within the progress length.

In some implementations, the portion of the video content to which the selected playback direction and the selected playback speed are applied may be determined based on the user interaction with the timeline element to move the timeline representation. In some implementations, the user interaction with the timeline element to move the timeline representation may include user interaction with the timeline element to drag the timeline representation. In some implementations, the user interaction with the timeline element to move the timeline representation may cause the current moment of the video content presented on the display to be changed in the selected playback direction.

In some implementations, a selected portion element may be presented with the timeline representation to visually indicate the portion of the video content to which the selected playback direction and the selected playback speed are applied. In some implementations, a selected playback direction element may be presented to visually indicate the selected playback direction for the portion of the video content and a selected playback speed element may be presented to visually indicate the selected playback speed for the portion of the video content.

In some implementations, the interface elements may further include a speed ramp element. The speed ramp element may enable user selection of speed ramp for the portion of the video content. A speed ramp curve element may be presented with the timeline representation to visually indicate the selected speed ramp for the portion of the video content. The speed ramp curve element may include a curve representation of the selected speed ramp. In some implementations, the curve representation of the selected speed ramp may be manipulable to change the selected speed ramp for the portion of the video content.

The generation component may be configured to apply the selected playback direction and the selected playback speed to the portion of the video content to generate a presentation of the video content. The presentation of the video content may include modification of the playback direction and the playback speed for the video content based on the selected playback direction for the portion of the video content, the selected playback speed for the portion of the video content, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
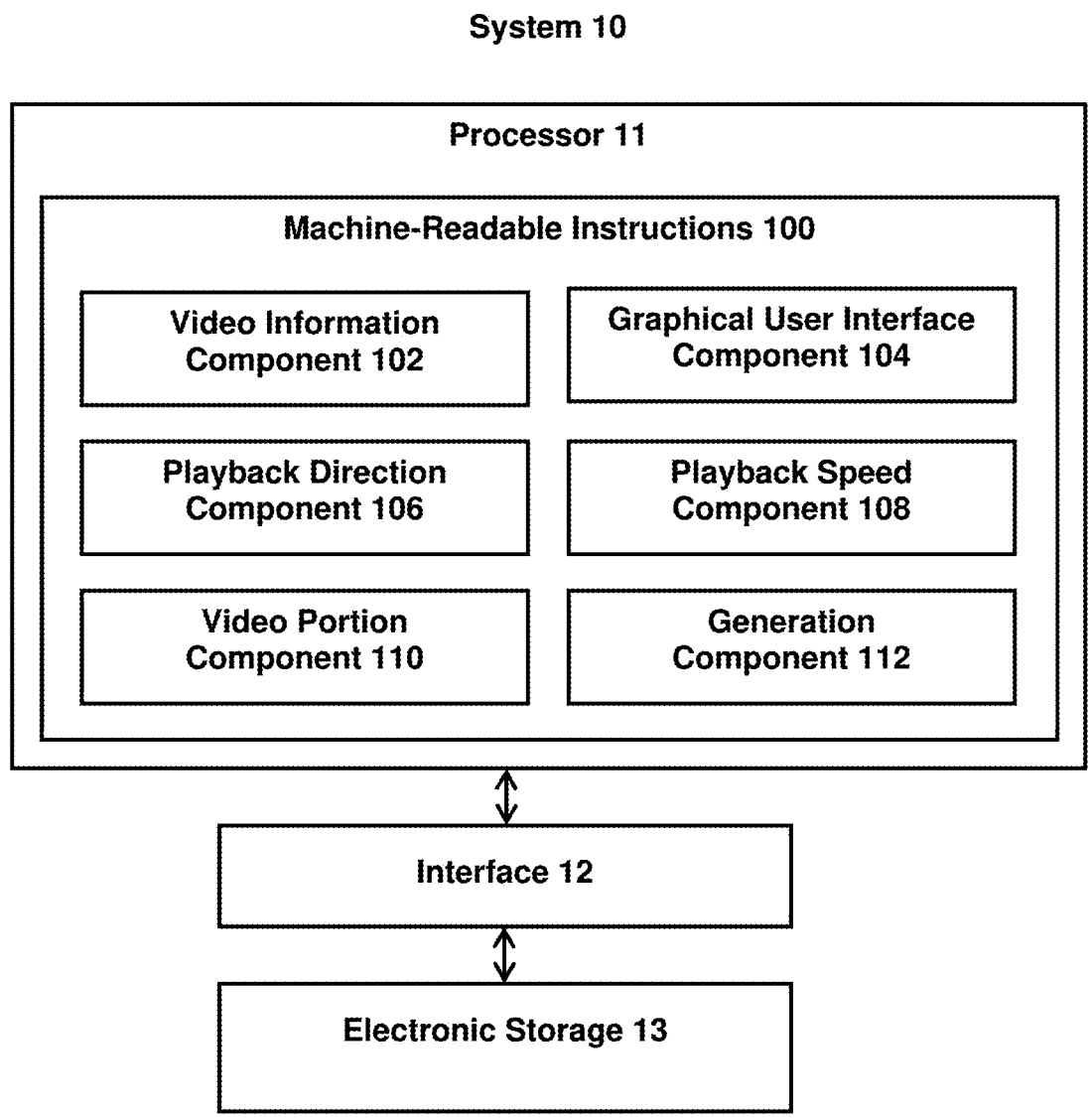
FIG. 1 illustrates a system that presents an interface for setting speed and direction of video playback.

FIG. 1 illustrates a system 10 that presents an interface for setting speed and direction of video playback. The system 10 may include one or more of a processor 11, an interface 12 (e.g., bus, wireless interface), an electronic storage 13, and/or other components. Video information and/or other information may be obtained by the processor 11. The video information may define video content having a progress length. A graphical user interface may be presented on a display by the processor 11. The graphical user interface may include interface elements that facilitate selection of playback direction and playback speed for the video content. The interface elements may include a playback direction element, a playback speed element, a timeline element, and/or other interface elements. The playback direction element may enable user selection of the playback direction from a selected moment within the progress length. The playback speed element may enable user selection of the playback speed in the selected playback direction from the selected moment within the progress length. The timeline element may include a timeline representation of the progress length and enable user selection of a portion of the video content to which the selected playback direction and the selected playback speed are applied.

The selected playback direction from the selected moment within the progress length may be determined by the processor 11 based on user interaction with the playback direction element and/or other information. The selected playback speed in the selected playback direction from the selected moment within the progress length may be determined by the processor 11 based on user interaction with the playback speed element and/or other information. The portion of the video content to which the selected playback direction and the selected playback speed are applied may be determined by the processor 11 based on user interaction with the timeline element and/or other information. The portion of the video content may start or end with the selected moment within the progress length. The selected playback direction and the selected playback speed may be applied to the portion of the video content by the processor 11 to generate a presentation of the video content. The presentation of the video content may include modification of the playback direction and the playback speed for the video content based on the selected playback direction and the selected playback speed for the portion of the video content, and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to video content, information relating to graphical user interface, information relating to interface elements, information relating to playback direction, information relating to playback speed, information relating to presentation of video content, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting an interface for setting speed and direction of video playback. The machine-readable instructions 100 may include one or more computer program components. The machine-readable instructions 100 may include one or more of a video information component 102, a graphical user interface component 104, a playback direction component 106, a playback speed component 108, a video portion component 110, a generation component 112, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video information component 102 may obtain video information from one or more locations. For example, the video information component 102 may obtain information from a storage location, such as the electronic storage 13, electronic storage of information and/or signals generated by one or more sensors, electronic storage of a device accessible via a network, and/or other locations. The video information component 102 may obtain information from one or more hardware components (e.g., an image sensor, a sound sensor) and/or one or more software components (e.g., software running on a computing device).

In some implementations, the video information component 102 may obtain video information based on user interaction with a user interface/application (e.g., video editing application, video player application), and/or other information. For example, a user interface/application may provide option(s) for a user to set speed and direction of video playback. The video information defining the video(s) may be obtained based on the user's selection of the video(s)

through the user interface/video application. Other selections of video for retrieval of video information are contemplated.

The video information may define video content having a progress length. The video information may define a video by including information that defines one or more content, qualities, attributes, features, and/or other aspects of the video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

In some implementations, the video content may include spherical video content. The field of view of the visual content of spherical video content may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

Video information may be stored within a single file or multiple files. For example, video information defining video content may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The graphical user interface component 104 may be configured to present one or more graphical user interfaces on a display. A display may refer to an electronic device that provides visual presentation of information. A display may be configured to present visual content, graphical user interface, and/or other information. In some implementations, a display may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. A display may be a standalone device or a component of a computing device, such as a display of a mobile device (e.g., camera, smartphone, smartwatch, tablet, laptop) or a desktop device (e.g., touch monitor). User interaction with elements of the graphical user interface may be received through the display (e.g., touchscreen display) and/or other user interface devices (e.g., keyboard, mouse, trackpad).

In some implementations, the video content (visual content of video content) may be presented on the display. In some implementations, one or more lower fidelity versions of the visual content may be generated for presentation on the display. A lower fidelity version of the visual content may refer to a version (e.g., copy) of the visual content that is reproduced with less quality than the original visual content. For example, a lower fidelity version of the visual content may include a lower resolution version of the visual content, a lower framerate version of the visual content, and/or other lower-quality version of the visual content. In some implementations, different lower fidelity versions of the visual content may be generated for different playback directions. For example, a lower fidelity version of the visual content may be generated for forward playback, with the video frames arranged in same order as the original visual content. A lower fidelity version of the visual content may be generated for reverse playback, with the video frames arranged in reverse order of the original visual content. In some implementations, a reverse-playback version of the visual content may be generated with the same resolution and/or same framerate as the original visual content. A reverse playback version of the visual content may be used to provide preview of the visual content in reverse direction and/or to generate presentation of the visual content in reverse direction.

A graphical user interface may refer to a user interface that enables a user to interact with the system 10 through one or more interface element. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

An interface element may refer to a graphical element of the user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., touchscreen display, keyboard, mouse, trackpad) and/or other user input. For example, a graphical user interface may present/include the interface elements in a particular arrangement and enable the user to interact with individual interface elements by engaging with locations corresponding to the individual interface elements on a touchscreen display.

A graphical user interface may include interface elements that facilitate selection of playback direction and playback speed for the video content. Such interface elements may enable a user to control the playback direction and/or playback speed of one or more portions of the video content. A portion of the video content may refer to a part of the video content (e.g., a part of video clip). A video portion of video content may be defined in terms of time durations and/or frame numbers. For example, video content may have a progress length of 60 seconds, and a portion of the video content may include a temporal portion (e.g., from 1 second mark to 2 second mark of the video clip) of the video content. Video content may have a progress length of 1800 video frames, and a portion of the video content may include a subset of video frames (e.g., video frames 31-60) of the video content. A user may interact with such interface elements to select and/or change back direction and/or playback speed of one or more portions of the video content. Such interface elements may visually provide information on the playback direction and/or playback speed selected for one or more portions of the video content.

The interface elements may include one or more of a playback direction element, a playback speed element, a timeline element, and/or other interface elements. A playback direction element may refer to an interface element that enables user selection of playback direction from one or more selected moments within the progress length. For example, a playback direction element may refer to an interface element that enables a user to provide input to the system 10 to set the playback direction from a selected moment within the progress length of the video content. For instance, a playback direction element may be presented/included within the graphical user interface as a button and user interaction (e.g., tapping, clicking on) with the button may provide one or more commands/information to the system to set the playback direction from a selected moment within the progress length of the video content.

Playback direction may refer to direction in which the video content (e.g., visual content) are to be provided (e.g., presented) during playback. Playback direction may refer to a perceived direction in which the visual content/video frames are to be presented during playback. Playback direction may include forward playback direction, reverse playback direction, pause playback direction, and/or other playback direction. That is, the playback direction selectable via the playback direction element may include forward playback direction, reverse playback direction, pause playback direction, and/or other playback direction.

A playback speed element may refer to an interface element that enables user selection of playback speed in the selected direction(s) from one or more selected moments within the progress length. For example, a playback speed element may refer to an interface element that enables a user to provide input to the system 10 to set the playback speed in a selected direction from a selected moment within the progress length of the video content. For instance, a playback speed element may be presented/included within the graphical user interface as a button and user interaction (e.g., tapping, clicking on) with the button may provide one or more commands/information to the system to set the playback speed in a selected direction from a selected moment within the progress length of the video content.

Playback speed may refer to speed with which the video content (e.g., visual content) are to be provided (e.g., presented) during playback. Playback speed may refer to a perceived speed with which the visual content/video frames are to be presented during playback. Playback speed may be same as the original speed (1×), faster than the original speed (faster than 1×) or slower than the original speed (slower than 1×). That is, the playback speed selectable via the playback speed element may include speed(s) same as, faster than, and/or slower than the original speed.

In some implementations, the playback direction element, the playback speed element, and/or other interface elements may be combined into a single element. For example, a single element may provide functionality of both the playback direction element and the playback speed element. The single element may include multiple options selectable by the user. Individual ones of the multiple options may define corresponding playback direction and corresponding playback speed. For example, the single element may include an option to set the playback direction to the reverse playback direction with a 2× playback speed, and another option to the set the playback direction to the forward playback direction with a 2× playback speed. Other options are contemplated.

In some implementations, the playback direction element, the playback speed element, and/or other interface elements may be separate from one another. For example, the playback direction element may include separate options for different playback directions and the playback speed element may include separate options for different playback speeds. For instance, the playback direction element may include an option to set the playback direction to the reverse playback direction, another option to set the playback direction to the forward playback direction, and another option to set the playback direction to the pause playback direction, while the playback speed element may include an option to set the playback speed to 2× playback speed and another option to set the playback speed to ½× playback speed. The playback direction element may include separate selectable options to set the playback direction to different directions (e.g., different buttons for different directions). The playback direction element may include a selectable option that is manipulatable to set the playback direction to different directions (e.g., toggle between forward direction and reverse direction). The playback speed element may include separate selectable options to set the playback speed to different speeds (e.g., different buttons for different speeds). The playback speed element may include a selectable option that is manipulatable to set the playback speed to different speeds (e.g., slider, scroller).

A timeline element may refer to an interface element that visually represents the progress length (e.g., duration) of the video content. A timeline element may include one or more timeline representations of the progress length of the video content. A timeline element may refer to an interface element that enables user selection of one or more portions of the video content to which the selected playback direction and the selected playback speed are applied. For example, a timeline element may refer to an interface element that enables a user to provide input to the system 10 based on movement of a timeline representation to select the portion(s) of the video content to which the selected playback direction and the selected playback speed are applied. The timeline element may enable selection of the portion(s) of the video content based on movement of a timeline representation.

In some implementations, a user may be able to control the amount of progress length represented by a timeline representation. For example, the timeline representation may visually represent the entire progress length of the video content or a portion of the progress length of the video content. A user may be able to change the amount of progress length represented by a timeline representation by increasing or decreasing the amount of progress length represented by the timeline representation. For example, a user may interact with the timeline representation by making a stretching or pinching gesture on a touchscreen display, which may cause the timeline representation to zoom in or zoom out on the amount of progress length represented by the timeline representation.

In some implementations, a certain amount of movement of the timeline representation may correspond to movement through the progress length of the video content at a constant scale regardless of the progress length of the video content. For example, the time amount of the duration of the video content represented by a portion of the timeline representation, rather than being determined based on the duration of the video content, may be set independent of the duration of the video content.

For example, a traditional scrubber (video progress bar) may represent the duration of video content of a video. The scrubber may have a certain size (e.g., length) within the graphical user interface. The size of the scrubber within the graphical user interface may represent the duration of the video content, and a portion (e.g., segment) of the scrubber may correspond to a portion of the duration of the video content at a non-constant scale. For example, for video content with a duration of ten minutes, the length of the scrubber may represent ten minutes and ten percent of the length of the scrubber may correspond to one minute of the duration of the video content. On the other hand, for video content with a duration of one minute, the length of the scrubber may represent one minute and ten percent of the length of the scrubber may correspond to six seconds of the duration of the video content.

The timeline representation of the duration within the timeline element, on the other hand, may represent a certain time amount regardless of the duration of the video content. The timeline representation may have a certain size (e.g., length) within the graphical user interface. The size (e.g., length) of the timeline representation within the graphical user interface may represent a certain time amount rather than the entire duration of the video content. A portion (e.g., segment) of the timeline representation may correspond to a fixed time duration. Setting the time amount represented by a portion of the timeline representation independent of the duration of the video content may result in the movement of the timeline representation corresponding to movement through the duration at a constant scale regardless of the duration of the video content.

For example, for video content with durations of ten minutes and one minute, ten percent of the length of the scrubber may correspond to ten seconds of the duration of both video content regardless of the total duration of the video content. Other time amount correspondence is contemplated. The time amount represented by the timeline representation may be set based on one or more defaults and/or based on user input. The movement of the timeline representation corresponding to movement through the duration of the video content at a constant scale may make it easier for users to control the amount of portions of the video content to which the selected playback direction and the selected playback speed are applied. Because the same amount of movement of the timeline representation corresponds to the same amount of the duration of the video content regardless of the total duration of the video content, users may learn to precisely control the video portion selection based on repeated movement of the timeline representation.

The timeline representation may enable selection of portions of the video content to which the selected playback direction and the selected playback speed are applied based on movement of the timeline representation. That is, the user may determine to which portions of the video content to which the selected playback direction and the selected playback speed are applied by moving the timeline representation itself. For example, the user may control the duration of the video content (from the selected moment) to which the selected playback direction and the selected playback speed are applied by moving (e.g., dragging) the timeline representation in one or more direction (e.g., right, left, up, down). That is, the user may "draw out" the portion of the video content to which the selected playback direction and the selected playback speed are applied by moving the timeline representation (rather than moving handles). Such selection of portions of video content may provide intuitive and granular control over finely tuned start/stop points of for different playback speeds and/or different playback direction, and may enable precise control in user selection of the portion(s) of the video content to which the selected playback speed and the selected playback direction are applied. Such selection of the portions of video content may provide fluid and intuitive experience in setting speed(s) and/or direction(s) of playback for the video.

In some implementations, the interface elements may further include a direction-speed element. A direction-speed element may refer to an interface element that enables user selection of a moment (selected moment) within the progress length for which playback direction and/or playback speed is to be selected (e.g., via the playback direction element, the playback speed element). For example, a direction-speed element may refer to an interface element that enables a user to provide input to the system to designate a particular moment within the progress length of the video content as the selected moment from which playback direction and/or playback speed is to be selected. The selected moment within the progress length may be determined to be the current moment of the video content presented on the display based on user interaction with the direction-speed element and/or other information. For instance, a direction-speed element may be presented/included within the graphical user interface as a button and user interaction (e.g., tapping, clicking on) with the button may provide one or more commands/information to the system 10 to set a moment (e.g., current play moment) within the progress length as the moment (point in time, duration of time) from which playback direction and/or playback speed is to be selected. That is, when the user interacts with the direction-speed element, the current moment of the video content presented on the display may be designated as the selected moment from which playback direction and/or playback speed is to be selected.

In some implementations, the direction-speed element may be presented on top of the timeline representation. The position of the direction-speed element on the timeline representation may visually indicate the current moment of the video content presented on the display. For example, the direction-speed element may be located at the middle of the timeline representation and/or at other locations along the timeline representation. In some implementations, the movement of the timeline representation to select the positions to which the selected playback direction and the selected playback speed are applied may include movement of the timeline representation along one or more sides of the direction-speed element. For example, the movement of the timeline representation may include the user dragging the timeline representation to the left or right/up or down of the direction-speed element. In some implementations, the direction-speed element may need to be pressed again to finish selection of the video portions. In some implementations, one or more visual characteristics of the direction-speed element may be changed to indicate to the user that the direction-speed element needs to be pressed again to finish selection of the video portions. For example, the direction-speed element may pulse in size and/or color to indicate to the user that the direction-speed element needs to be pressed again to finish selection of the video portions.

In some implementations, the interface elements may include a selection element. A selection element may visually represent the selected moment within the progress length. For example, the selection element may visually indicate which moment within the progress length of the video content was designated as the selected moment via user interaction with the direction-speed element. The selection element may visually represent the selected portion(s) of the video content to which the selected playback direction and the selected playback speed are applied. For example, the selected portion(s) of the video content may be represented by a line between the selected moment within the progress length and the current moment of the video content presented on the display (e.g., as indicated by the direction-speed element). The length of the line may correspond to the amount of the selected portion(s) (longer line corresponding to longer amount of selected portion, shorter line corresponding to shorter amount of selected portion).

In some implementations, graphical user interface component 104 may be configured to present one or more interface elements responsive to user interaction with one or more other interface elements and/or other information. For example, the graphical user interface component 104 may be configured to, responsive to user interaction with the direction-speed element, present the playback direction element and/or the playback speed element, enabling the user to select the playback direction and/or the playback speed from the selected moment within the progress length.

As another example, the graphical user interface component 104 may be configured to change the playback speed element responsive to user interaction with the playback direction element. For instance, responsive to user selection of forward playback direction using the playback direction element, options for different positive playback speeds (e.g., ⅛×, ¼×, ½×, 1×, 2×, 4×, 8×) may be presented within the playback speed element. responsive to user selection of reverse playback direction using the playback direction element, options for different negative playback speeds (−⅛×, −¼×, −½×, −1×, −2×, −4×, −8×) may be presented within the playback speed element.

As another example, the graphical user interface component 104 may be configured to present and/or change the selection element responsive to user interaction with the timeline element/timeline representation. The selection element may be presented/changed to visually indicate the amount of video portion(s) to which the selected playback direction and the selected playback speed are applied. For example, as the timeline representation is dragged by the user to increase the amount of video portion selected, the part of the selection element that visually indicates the selected moment within the progress length may move away from the direction-speed element (which visually indicates the current moment of the video content being presented on the display). As the timeline representation is dragged by the user to increase the amount of video portion selected, the line between the selected moment within the progress length and the current moment of the video content presented on the display may increase in length.

Figure 3A:
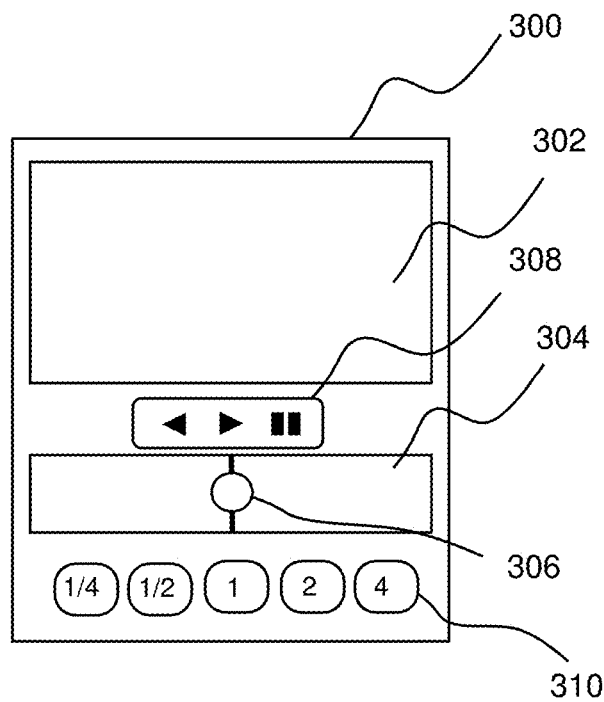
FIGS. 3A and 3B illustrate example graphical user interface and interface elements for setting speed and direction of video playback.
Figure 3B:
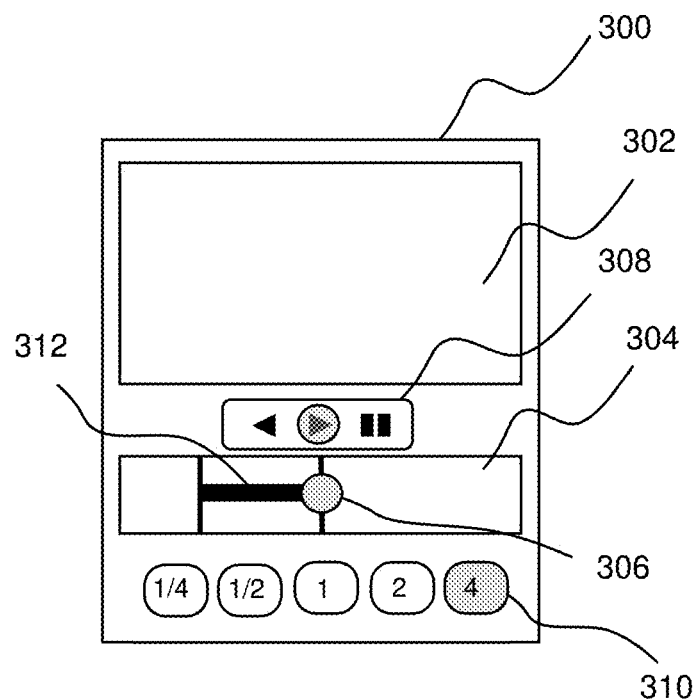

FIGS. 3A and 3B illustrate example graphical user interface and interface elements for setting speed and direction of video playback. These graphical user interfaces and interface elements are provided merely as examples, and the arrangement and visual aspects of the graphical user interfaces and interface elements may vary depending on the implementation. In some implementations, the graphical user interfaces and/or interface elements may include additional features and/or alternative features.

FIGS. 3A and 3B illustrate a graphical user interface 300. Referring to FIG. 3A, the graphical user interface 300 may include a visual content playback portion 302. The visual content playback portion 302 may include presentation of video content (visual content of the video content). The graphical user interface 300 may include a timeline element 304. The timeline element 304 may include a timeline representation of the progress length (entire progress length, a portion of the progress length) of the video content. The entirety or one or more portions of the timeline element 304 may include/be the timeline representation. The graphical user interface may include a direction-speed element 306. The direction-speed element 306 may visually represent current moment of the video content being presented within the visual content playback portion 302 and/or moment of the video content to be selected for change in playback direction and/or playback speed. In some implementations, the direction-speed element 306 may include and/or be accompanied by information providing detail on the current moment and/or selection moment. For example, the direction-speed element 306 may include and/or be accompanied by information on the time position (e.g., minute: second) and/or frame position (e.g., frame number) of the video content that is being presented within the visual content playback portion 302.

The graphical user interface 300 may include one or more interface elements to provide one or more commands to the system 10. For example, a user may interact (e.g., tap, click on) the direction-speed element 306 to provide one or more commands/information to the system 10 to set a moment (e.g., current play moment indicated by the direction-speed element 306) within the progress length as the selected moment for/from which playback speed and/or playback direction is to be selected.

The graphical user interface 300 may include a playback direction element 308 and a playback speed element 310. The playback direction element 308 may include options selectable by a user to select playback direction from the selected moment within the progress length of the video content. For example, the options may include a reverse playback option, a forward playback option, a pause playback option, and/or other playback options. The playback speed element 310 may include options selectable by a user to select playback speed in the selected playback direction from the selected moment within the progress length of the video content. For example, the options may include a ¼× option, a ½× option, a 1× option, a 2× option, a 4× option, and/or other speed options. Other options are contemplated.

In some implementations, one or more interface elements of the graphical user interface 300 may be changed. For example, responsive to user selection of the reverse playback option from the playback direction element 308, the playback speed element 310 may be changed to present −¼× option, a −½× option, a −1× option, a −2× option, a −4× option, and/or other speed options. As another example, responsive to user selection of the pause playback option from the playback direction element 308, the playback speed element 310 may be changed to not show any speed options. Other changes in the interface elements are contemplated.

User may interact with the timeline element 304/timeline representation to select portion(s) of the video content to which the selected playback direction and the selected playback speed are applied. The extent (amount) of the portions that are selected may depend on how much the timeline element 304/timeline representation is moved by the user. For example, the user dragging the timeline element 304/timeline representation a short amount may result in a short extent (small amount) of the portions being selected and the user dragging the timeline element 304/timeline representation a long amount may result in a long extent (large amount) of the portions being selected.

User selection of the playback direction may determine which portions of the video content (portions preceding the selected moment, portions following the selected moment, the selected moment) are selected responsive to user interaction with the timeline element 304/timeline representation. For example, user selection of the forward playback direction followed by movement of the timeline element 304/timeline representation may cause a portion of the video content following the selected moment to be selected. That is, as the user moves the timeline element 304/timeline representation, later moments within the progress length may be selected. User selection of the reverse playback direction followed by movement of the timeline element 304/timeline representation may cause a portion of the video content preceding the selected moment to be selected. That is, as the user moves the timeline element 304/timeline representation, preceding moments within the progress length may be selected.

User selection of the pause playback direction followed by movement of the timeline element 304/timeline representation may cause the selected moment within the progress length to be duplicated. That is, as the user moves the timeline element 304/timeline representation, the selected moment within the progress length may be duplicated (video frame corresponding to the selected moment duplicated) so that the presentation of the video content appears to include the selected moment "frozen" in time. The amount by which the selected moment is duplicated may depend on how much the timeline element 304/timeline representation is moved by the user.

As shown in FIG. 3B, a user may have selected the forward playback direction from the playback direction element 308 and the 4× playback speed from the playback speed element 310. Responsive to the user dragging the timeline element 304/timeline representation to the left, a selection element 312 may be presented on top of the timeline element 304/timeline representation. The vertical line of the selection element 312 may visually represent the selected moment within the progress length. The horizontal line of the selection element 312 may visually represent the selected portion(s) of the video content to which the selected playback direction and the selected playback speed are applied. In some implementations, one or more visual characteristics of the direction-speed element 306 may be changed to indicate to the user that the direction-speed element 306 needs to be pressed again to finish selection of the video portions.

The playback direction component 106 may be configured to determine the selected playback direction from the selected moment within the progress length. The selected playback speed from the selected moment within the progress length may be determined based on user interaction with the playback direction element and/or other information. Determining the selected playback direction may include determining one or more values that reflect or define the selected playback direction. A selected moment within the progress length may refer to a point/duration within the progress length for/from which playback direction and/or playback speed are determined. A selected moment within the progress length may refer to a point/duration within the progress length for/from which playback direction and/or playback speed are set/changed.

Determining the selected playback direction may include determining how the user interacted with the playback direction element to select the playback direction. For example, the playback direction component 106 may be configured to determine the selected playback direction from the selected moment within the progress length to be in the forward playback direction based on user interaction with a forward playback option of the playback direction element. Selection of the forward playback direction may cause the selected portion of the video content to appear to be played back in forward direction during presentation.

The playback direction component 106 may be configured to determine the selected playback direction from the selected moment within the progress length to be in the reverse playback direction based on user interaction with a reverse playback option of the playback direction element. Selection of the reverse playback direction may cause the selected portion of the video content to appear to be played back in revere direction during presentation.

The playback direction component 106 may be configured to determine the selected playback direction from the selected moment within the progress length to be in the pause playback direction based on user interaction with a pause playback option of the playback direction element. Selection of the pause playback direction may cause the selected moment of the video content to appear to be frozen during presentation.

The playback speed component 108 may be configured to determine the selected playback speed in the selected playback direction from the selected moment within the progress length. The selected playback speed in the selected playback direction from the selected moment within the progress length may be determined based on user interaction with the playback speed element and/or other information. Determining the selected playback speed may include determining one or more values that reflect or define the selected playback speed in the selected playback direction from the selected moment within the progress length. Determining the selected playback speed may include determining how the user interacted with the playback speed element to select the playback speed. For example, the playback speed component 108 may be configured to determine the speed factor (e.g., ⅛×, ¼×, ½×, 1×, 2×, 4×, 8×) to be applied to the selected portion of the video content (in the forward direction or in the reverse direction) based on user interaction with the playback speed element.

In some implementations, one or more warnings may be presented based on the selected playback speed and the framerate of the video content. Slowing down playback of video content too much may result in presentation of video content that appears choppy. The amount by which the video content may be slowed down without impacting quality of presentation may depend on the framerate of the video content. Video content with high framerate may be slowed down much more than video content with low framerate without impacting quality of presentation. Based on the framerate of the video content, a constraint/limit on slowdown factor for the playback speed may be determined. Responsive to user selection of playback speed that violates the constraint/limit, a warning may be presented to inform the user that the selected playback speed may result in unpleasant (e.g., choppy) viewing experience.

The video portion component 110 may be configured to determine the portion(s) of the video content to which the selected playback direction and the selected playback speed are applied. The portion(s) of the video content to which the selected playback direction and the selected playback speed are applied may be determined based on user interaction with the timeline element and/or other information. The portion(s) of the video content that are selected may be determined based user interaction with the timeline element/timeline representation after user selection of the playback direction and/or the playback speed. The portion(s) of the video content that are selected may include portion(s) following or preceding the selected moment within the progress length. Whether the selected portion(s) include portion(s) following or preceding the selected moment may depend on the playback direction selected by the user for the selected moment. The selected portion(s) may include portion(s) following the selected moment based on user selection of the forward playback direction. The selected portion(s) may include portion(s) preceding the selected moment based on user selection of the reverse playback direction. The selected portion(s) may include the selected moment based on user selection of the pause playback direction. The extent/amount of portion(s) that are selected for the selected playback direction and the selected speed may depend on how the user interacted with the timeline element/timeline representation.

In some implementations, the portion(s) of the video content to which the selected playback direction and the selected playback speed are applied may be determined based on the user interaction with the timeline element to move the timeline representation. In some implementations, a user may interact with the timeline element/timeline representation to drag the timeline representation in one or more directions. The extent/amount of portion(s) that are selected for the selected playback direction and the selected speed may depend on how much the user moved/dragged the timeline element/timeline representation. In some implementations, a user may interact with the timeline element/ timeline representation to move the timeline representation by engaging a play element to cause playback of the video content. For example, the user may have selected the playback direction and the playback speed, and then may have interacted with the play element to cause playback of the video content. The playback of the visual content may cause the timeline element/timeline representation to move to the left and result in selection of the portion(s) that have been played.

In some implementations, the user interaction with the timeline element to move the timeline representation may cause the current moment of the video content presented on the display to be changed in the selected playback direction. For example, based on user selection of the forward playback direction, when the user moves the timeline representation, the current moment of the video content presented on the display may be changed in forward direction. Based on user selection of the reverse playback direction, when the user moves the timeline representation, the current moment of the video content presented on the display may be changed in reverse direction. On the other hand, based on user selection of the pause playback direction, when the user moves the timeline representation, the current moment of the video content presented on the display may not be changed. That is, the same moment (same video frame) may be presented as the user moves the timeline representation.

In some implementations, a selected portion element may be presented with the timeline representation. A selected portion element may visually indicate a portion of the video content to which the selected playback direction and the selected playback speed are applied. In some implementations, a selected playback direction element and/or a selected playback speed element may be presented with the selected portion element. The selected playback direction element may visually indicate the selected playback direction for the portion of the video content. The selected playback speed element may visually indicate the selected playback speed for the portion of the video content.

Figure 4:
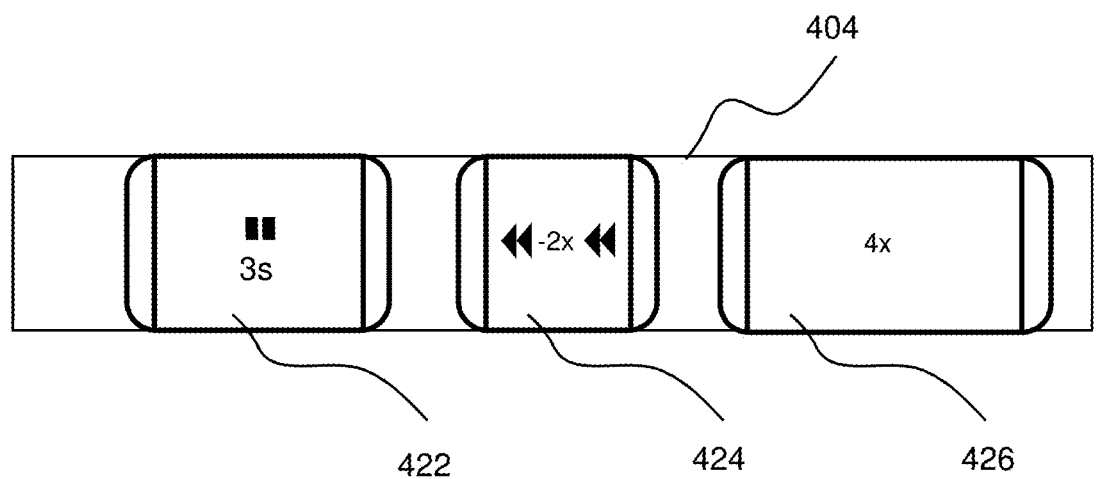
FIG. 4 illustrates example selected portion elements.

FIG. 4 illustrates example selected portion elements 422, 424, 426. The selected portion elements 422, 424, 426 may be presented with a timeline element 404. The selected portion elements 422, 424, 426 may visually indicate portions of the video content to which the selected playback direction and the selected playback speed are applied. The selected portion element 422 may include a pause symbol to visually indicate that pause playback direction has been selected for the selected moment within the progress length of the video content. The selected portion element 422 may include indication of how long (e.g., 3 seconds) the selected moment should be displayed (how long the shot is to be frozen) during presentation of the video content.

The selected portion element 424 may include a reverse symbol to visually indicate that reverse playback direction has been selected for the corresponding portion within the progress length of the video content. The selected portion element 424 may include indication of the selected playback speed (e.g., −2×) for the corresponding portion within the progress length of the video content.

The selected portion element 426 may not include a playback symbol to visually indicate that forward playback direction has been selected for the corresponding portion within the progress length of the video content. Alternatively, the selected portion element 426 may include a forward playback symbol to visually indicate that forward playback direction has been selected for the corresponding portion within the progress length of the video content. The selected portion element 426 may include indication of the selected playback speed (e.g., 4×) for the corresponding portion within the progress length of the video content.

The selected portion elements 422, 424, 426 may include handles on two opposing sides. The handles may enable a user to change the portions to which the selected playback direction and the selected playback speed are applied. In some implementations, a user may be required to trigger the handles before the handles can be moved. For example, responsive to user selection of the selected portion elements 422, an edit icon may be presented within the handles. The user may be required to engage the edit icon before the handles can be moved.

In some implementations, a user may move along the timeline element 404 to alter the selected playback direction, the selected playback speed, and/or the selected portion of the video content. For example, the user may scroll along the timeline element 404 to position a cursor inside a selected portion element. In response, the playback direction element, the playback speed element, and/or other elements of the graphical user interface may be presented/activated to allow the user to change the selected playback direction, the selected playback speed, and/or the selected portion of the video content corresponding to the selected portion element. In some implementations, the playback direction element may visually indicate the currently selected playback direction and the playback speed element may visually indicate the currently selected playback speed.

Figure 5:
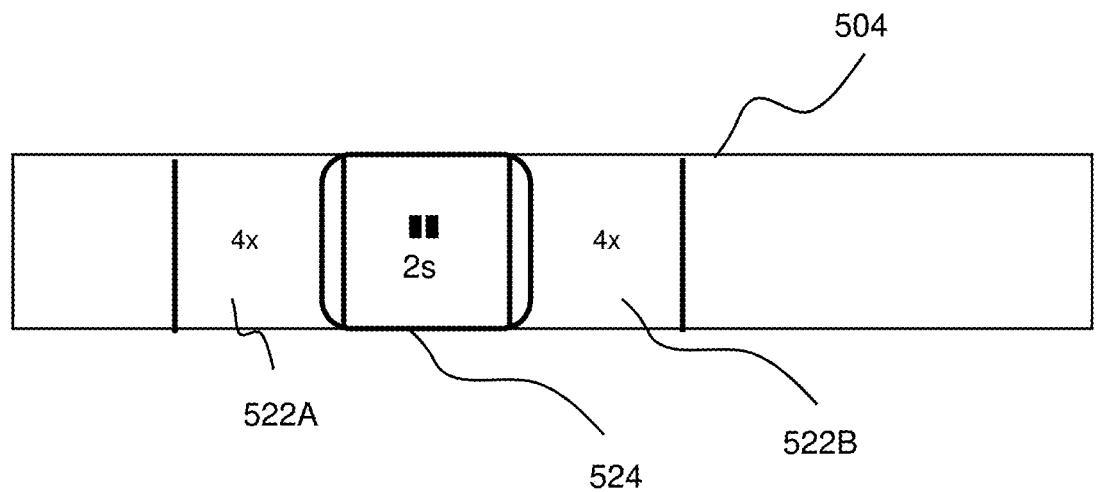
FIG. 5 illustrates example selected portion within another selected portion.

In some implementations, a user may be allowed to alter the selected playback direction, the selected playback speed, and/or the selected portion of the video content by inserting a selected portion within another selected portion of the video content. FIG. 5 illustrates example selected portion within another selected portion. The user may have originally selected forward playback direction and a 4× playback speed for a portion of the video content. Within that portion of the video content, the user may have inserted a new direction-speed portion, such as a new portion that includes pause-playback of a selected moment for 2 second duration. As shown in FIG. 5, the original selected portion element may have been split into two selected portion elements

522A, 522B. A new selected portion element 524 may be presented between the two selected portion elements 522A, 522B.

In some implementations, handles may be presented for all selected portion elements presented on the display. In some implementations, handles may be presented only for a selected portion element. For example, in FIG. 5, the user may have selected the selected portion element 524 (e.g., by clicking on the selected portion element 524, by placing a cursor/direction-speed element inside the selected portion element 524). In response, handles of the selected portion element 524 may be presented while handles of the selected portion elements 522A, 522B may not be presented.

Figure 6A:
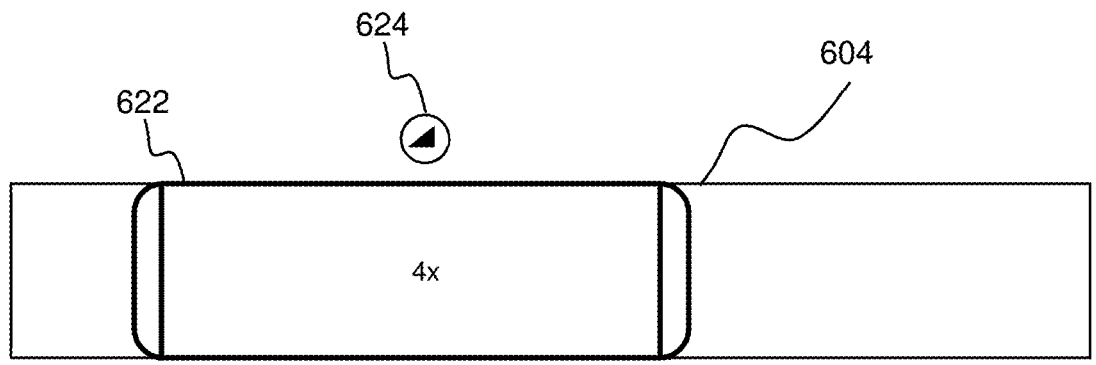
FIG. 6A illustrates example speed ramp element.

In some implementations, the graphical user interface may include other interface elements. For example, the graphical user interface may include a delete element that enables a user to delete a selected playback direction, a selected playback speed, and/or a selected portion of the video content. For example, responsive to user selection of a selected portion element, the delete element may be presented. As another example, the graphical user interface may include a speed ramp element. FIG. 6A illustrates example speed ramp element 624. In some implementations, the speed ramp element 624 may be presented responsive to user selection of a selected portion element 622 along a timeline element 604. The speed ramp element 624 may enable user selection of speed ramp for the portion of the video content. In some implementations, user interaction with the speed ramp element 624 may cause a default speed ramp to be selected. In some implementations, a user may be provided with options to select from different speed ramps. Responsive to user interaction with the speed ramp element 624, a speed ramp may be applied to the portion of the video content corresponding to the selected portion element 622. A speed ramp may change playback speed of the portion of the video content.

Figure 6B:
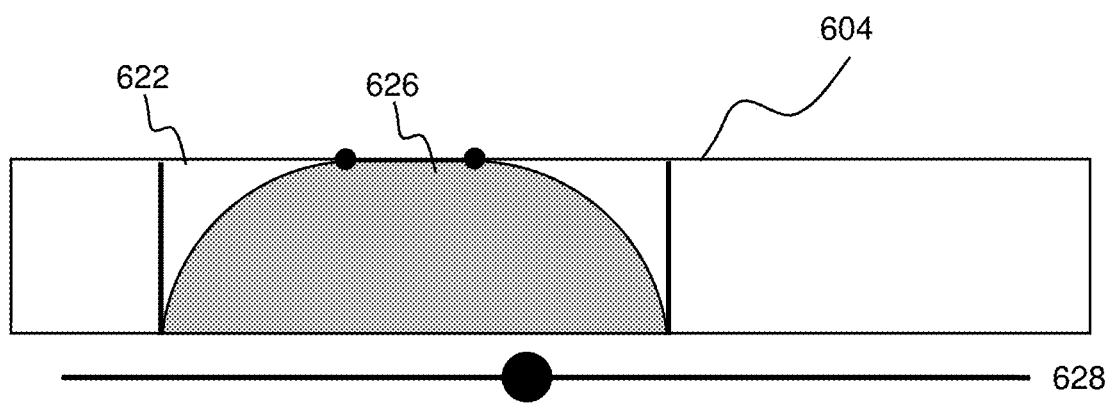
FIGS. 6B and 6C illustrate example speed ramp curve element.
Figure 6C:
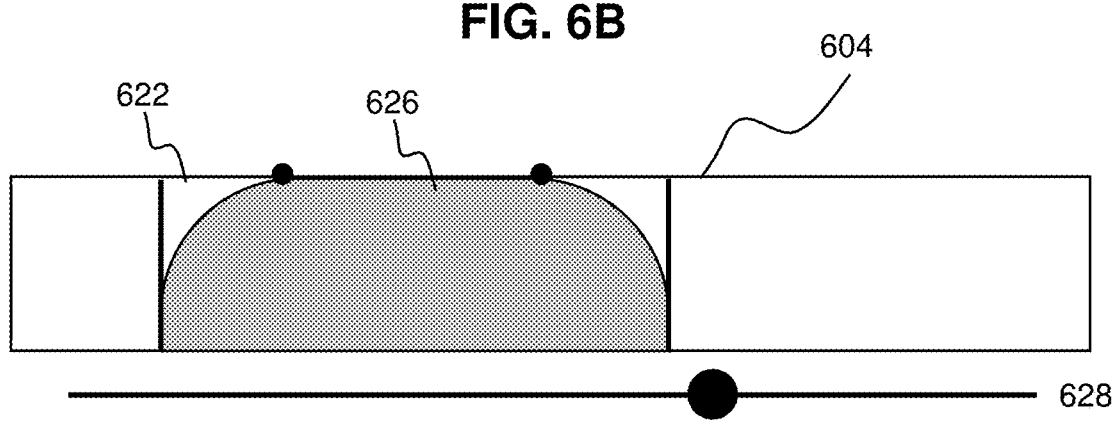

In some implementations, a speed ramp curve element may be presented with the timeline representation. The speed ramp curve element may visually indicate the selected speed ramp for the portion of the video content. For example, FIGS. 6B and 6C illustrate an example speed ramp curve element 626. The speed ramp curve element 626 may include a curve representation of the selected speed ramp. In some implementations, the curve representation of the selected speed ramp may be manipulable to change the selected speed ramp for the portion of the video content. For example, the speed ramp curve element 626 may include points that may be moved to change the profile of speed change (e.g., change slope/shape of speed change). In some implementations, a speed ramp bar element 628 may be presented. The speed ramp bar element 628 may provide options for a user to select among different speed ramps, such as by positioning a selector at different positions along the speed ramp bar element 628.

The generation component 112 may be configured to generate one or more presentations of the video content. A presentation of the video content may refer to playback of the video content, storage of the video content in one or more forms for playback at a later time, and/or other presentation of the video content. For example, a presentation of the video content may include presentation of the visual content on the display, playback of audio content through a speaker, and/or other presentation of video content. A presentation of video content may be generated by applying the selected playback direction(s) and the selected playback speed(s) to the portion(s) of the video content.

The presentation of the video content may include modification of the playback direction and the playback speed for the video content. In some implementations, the playback direction and the playback speed for the video content may be modified from default playback direction (e.g., forward playback direction) and default playback speed (e.g., 1× speed).

The playback direction for the video content may be modified based on the selected playback direction(s) for the portion(s) of the video content and/or other information. The playback direction for the video content may be modified in accordance with the selected playback direction so that the playback direction and/or the perceived playback direction for a corresponding portion of the video content is in the selected playback direction.

The playback speed for the video content may be modified based on the selected playback speed(s) for the portion(s) of the video content and/or other information. The playback speed for the video content may be modified in accordance with the selected playback speed so that the playback speed and/or the perceived playback speed for a corresponding portion of the video content is the selected playback speed.

A presentation of the video content may be generated as encoded video content (e.g., encoded video file) and/or as instructions for presenting the video content. For example, the presentation of the video content may be generated as an encoded version of a particular video clip, and the video clip may be opened in a video player for played on the display(s). The presentation of the video content may be generated as instructions identifying portions of the video content (e.g., temporal portions, video frames) that have been selected and the playback direction and the playback speed for the selected portions. A video player may use the instructions to retrieve the portions of the video content identified in the instructions for presentation in accordance with the selected playback direction and the selected playback speed.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
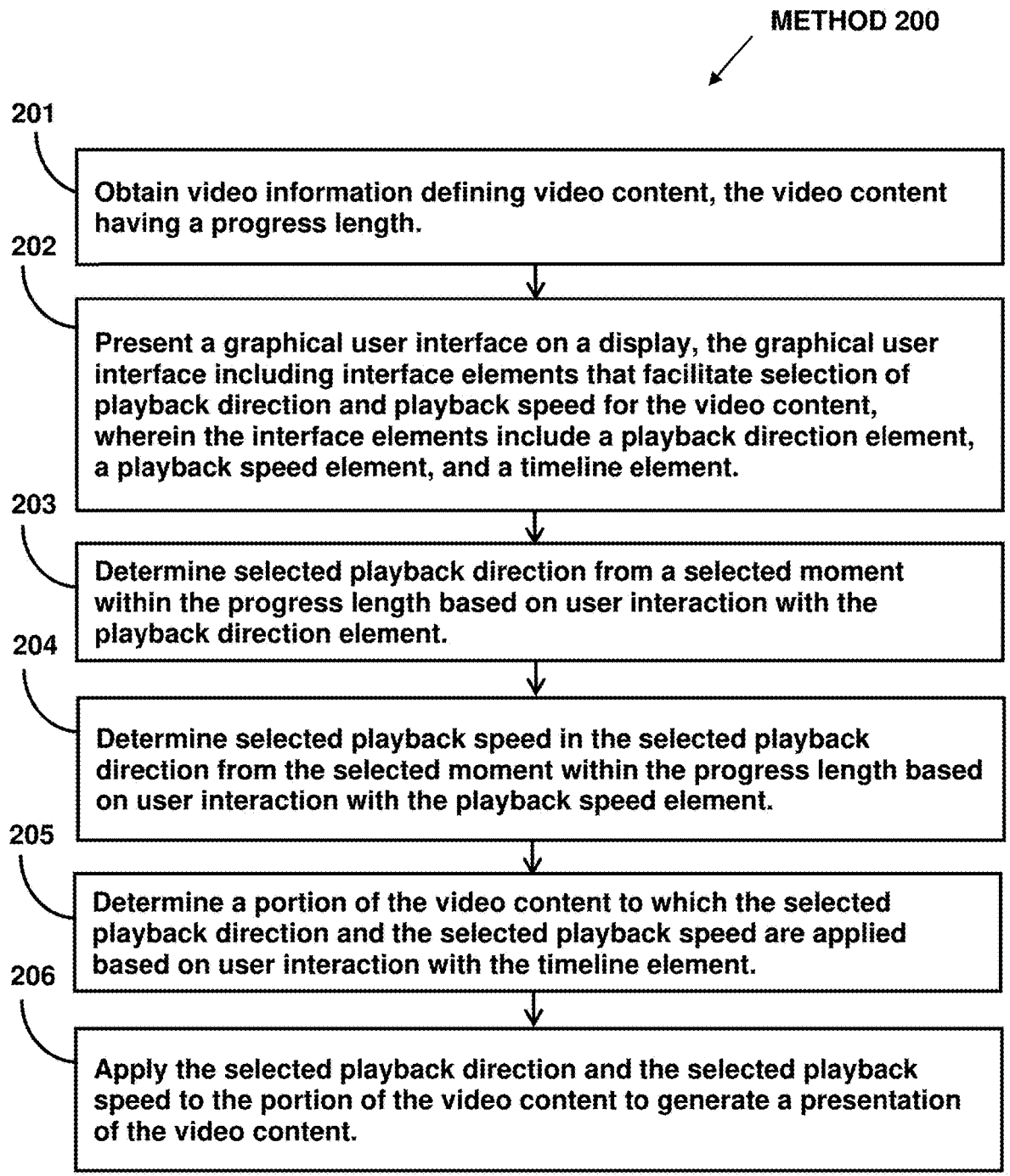
FIG. 2 illustrates a method for presenting an interface for setting speed and direction of video playback.

FIG. 2 illustrates method 200 for presenting an interface for setting speed and direction of video playback. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define video content having a progress length. In some implementations, operation 201 may be performed by a processor component the same as or similar to the video information component 102 (Shown in FIG. 1 and described herein).

At operation 202, a graphical user interface may be presented on a display. The graphical user interface may include interface elements that facilitate selection of playback direction and playback speed for the video content. The interface elements may include a playback direction element, a playback speed element, a timeline element, and/or other interface elements. The playback direction element may enable user selection of the playback direction from a selected moment within the progress length. The playback speed element may enable user selection of the playback speed in the selected playback direction from the selected moment within the progress length. The timeline element may include a timeline representation of the progress length and enable user selection of a portion of the video content to which the selected playback direction and the selected playback speed are applied. In some implementations, operation 202 may be performed by a processor component the same as or similar to the graphical user interface component 104 (Shown in FIG. 1 and described herein).

At operation 203, the selected playback direction from the selected moment within the progress length may be determined based on user interaction with the playback direction element and/or other information. In some implementations, operation 203 may be performed by a processor component the same as or similar to the playback direction component 106 (Shown in FIG. 1 and described herein).

At operation 204, the selected playback speed in the selected playback direction from the selected moment within the progress length may be determined based on user interaction with the playback speed element and/or other information. In some implementations, operation 204 may be performed by a processor component the same as or similar to the playback speed component 108 (Shown in FIG. 1 and described herein).

At operation 205, the portion of the video content to which the selected playback direction and the selected playback speed are applied may be determined based on user interaction with the timeline element and/or other information. The portion of the video content may start or end with the selected moment within the progress length. In some implementations, operation 205 may be performed by a processor component the same as or similar to the video portion component 110 (Shown in FIG. 1 and described herein).

At operation 206, the selected playback direction and the selected playback speed may be applied to the portion of the video content to generate a presentation of the video content. The presentation of the video content may include modification of the playback direction and the playback speed for the video content based on the selected playback direction and the selected playback speed for the portion of the video content, and/or other information. In some implementations, operation 206 may be performed by a processor component the same as or similar to the generation component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that presents an interface for setting speed and direction of video playback, the system comprising:
one or more physical processors configured by machine-readable instructions to:
obtain video information defining video content, the video content having a progress length;
present a graphical user interface on a display, the graphical user interface including interface elements that facilitate selection of playback direction and playback speed for the video content, wherein the interface elements include a playback direction element, a playback speed element, a timeline element, and a speed ramp element, the playback direction element enabling user selection of the playback direction from a selected moment within the progress length, the playback speed element enabling user selection of the playback speed in the selected playback direction from the selected moment within the progress length, the timeline element including a timeline representation of the progress length and enabling user selection of a portion of the video content to which the selected playback direction and the selected playback speed are applied, the speed ramp element enabling user selection of speed ramp for the portion of the video content, wherein a speed ramp curve element is presented with the timeline representation to visually indicate the selected speed ramp for the portion of the video content, the speed ramp curve element including a curve representation of the selected speed ramp;
determine the selected playback direction from the selected moment within the progress length based on user interaction with the playback direction element;
determine the selected playback speed in the selected playback direction from the selected moment within the progress length based on user interaction with the playback speed element;
determine the portion of the video content to which the selected playback direction and the selected playback speed are applied based on user interaction with the timeline element, the portion of the video content starting or ending with the selected moment within the progress length; and
apply the selected playback direction and the selected playback speed to the portion of the video content to generate a presentation of the video content, the presentation of the video content including modification of the playback direction and the playback speed for the video content based on the selected playback direction and the selected playback speed for the portion of the video content.

2. The system of claim 1, wherein the playback direction selectable via the playback direction element includes forward playback direction, reverse playback direction, and pause playback direction.

3. The system of claim 2, wherein the portion of the video content to which the selected playback direction and the selected playback speed are applied is determined based on the user interaction with the timeline element to move the timeline representation.

4. The system of claim 3, wherein the user interaction with the timeline element to move the timeline representation includes user interaction with the timeline element to drag the timeline representation.

5. The system of claim 4, wherein:
the interface elements further include a direction-speed element;
the direction-speed element enables user selection of the selected moment within the progress length;
the video content is presented on the display; and
the selected moment within the progress length is determined to be a current moment of the video content presented on the display based on user interaction with the direction-speed element.

6. The system of claim 5, wherein the user interaction with the timeline element to move the timeline representation causes the current moment of the video content presented on the display to be changed in the selected playback direction.

7. The system of claim 1, wherein a selected portion element is presented with the timeline representation to visually indicate the portion of the video content to which the selected playback direction and the selected playback speed are applied.

8. The system of claim 7, wherein a selected playback direction element is presented to visually indicate the selected playback direction for the portion of the video content and a selected playback speed element is presented to visually indicate the selected playback speed for the portion of the video content.

9. The system of claim 7, wherein the speed ramp element is presented responsive to user selection of the selected portion element.

10. The system of claim 1, wherein the curve representation of the selected speed ramp is manipulable to change the selected speed ramp for the portion of the video content.

11. The system of claim 1, wherein the graphical user interface further includes a speed ramp bar element, the speed ramp bar element enabling the user selection of the speed ramp for the portion of the video content from different selectable speed ramps via positioning of a selector at different positions along the speed ramp bar element.

12. A method for presenting an interface for setting speed and direction of video playback, the method performed by a computing system including one or more processors, the method comprising:
  obtaining, by the computing system, video information defining video content, the video content having a progress length;
  presenting, by the computing system, a graphical user interface on a display, the graphical user interface including interface elements that facilitate selection of playback direction and playback speed for the video content, wherein the interface elements include a playback direction element, a playback speed element, a timeline element, and a speed ramp element, the playback direction element enabling user selection of the playback direction from a selected moment within the progress length, the playback speed element enabling user selection of the playback speed in the selected playback direction from the selected moment within the progress length, the timeline element including a timeline representation of the progress length and enabling user selection of a portion of the video content to which the selected playback direction and the selected playback speed are applied, the speed ramp element enabling user selection of speed ramp for the portion of the video content, wherein a speed ramp curve element is presented with the timeline representation to visually indicate the selected speed ramp for the portion of the video content, the speed ramp curve element including a curve representation of the selected speed ramp;
  determining, by the computing system, the selected playback direction from the selected moment within the progress length based on user interaction with the playback direction element;
  determining, by the computing system, the selected playback speed in the selected playback direction from the selected moment within the progress length based on user interaction with the playback speed element;
  determining, by the computing system, the portion of the video content to which the selected playback direction and the selected playback speed are applied based on user interaction with the timeline element, the portion of the video content starting or ending with the selected moment within the progress length; and
  applying, by the computing system, the selected playback direction and the selected playback speed to the portion of the video content to generate a presentation of the video content, the presentation of the video content including modification of the playback direction and the playback speed for the video content based on the selected playback direction and the selected playback speed for the portion of the video content.

13. The method of claim 12, wherein the playback direction selectable via the playback direction element includes forward playback direction, reverse playback direction, and pause playback direction.

14. The method of claim 13, wherein the portion of the video content to which the selected playback direction and the selected playback speed are applied is determined based on the user interaction with the timeline element to move the timeline representation.

15. The method of claim 14, wherein the user interaction with the timeline element to move the timeline representation includes user interaction with the timeline element to drag the timeline representation.

16. The method of claim 15, wherein:
  the interface elements further include a direction-speed element;
  the direction-speed element enables user selection of the selected moment within the progress length;
  the video content is presented on the display; and
  the selected moment within the progress length is determined to be a current moment of the video content presented on the display based on user interaction with the direction-speed element.

17. The method of claim 16, wherein the user interaction with the timeline element to move the timeline representation causes the current moment of the video content presented on the display to be changed in the selected playback direction.

18. The method of claim 12, wherein a selected portion element is presented with the timeline representation to visually indicate the portion of the video content to which the selected playback direction and the selected playback speed are applied.

19. The method of claim 18, wherein a selected playback direction element is presented to visually indicate the selected playback direction for the portion of the video content and a selected playback speed element is presented to visually indicate the selected playback speed for the portion of the video content.

20. The method of claim 12, wherein the curve representation of the selected speed ramp is manipulable to change the selected speed ramp for the portion of the video content.

* * * * *